Aug. 29, 1961 G. L. BROCK 2,998,498
SIGNALLING DEVICE
Filed Nov. 12, 1959 2 Sheets-Sheet 2

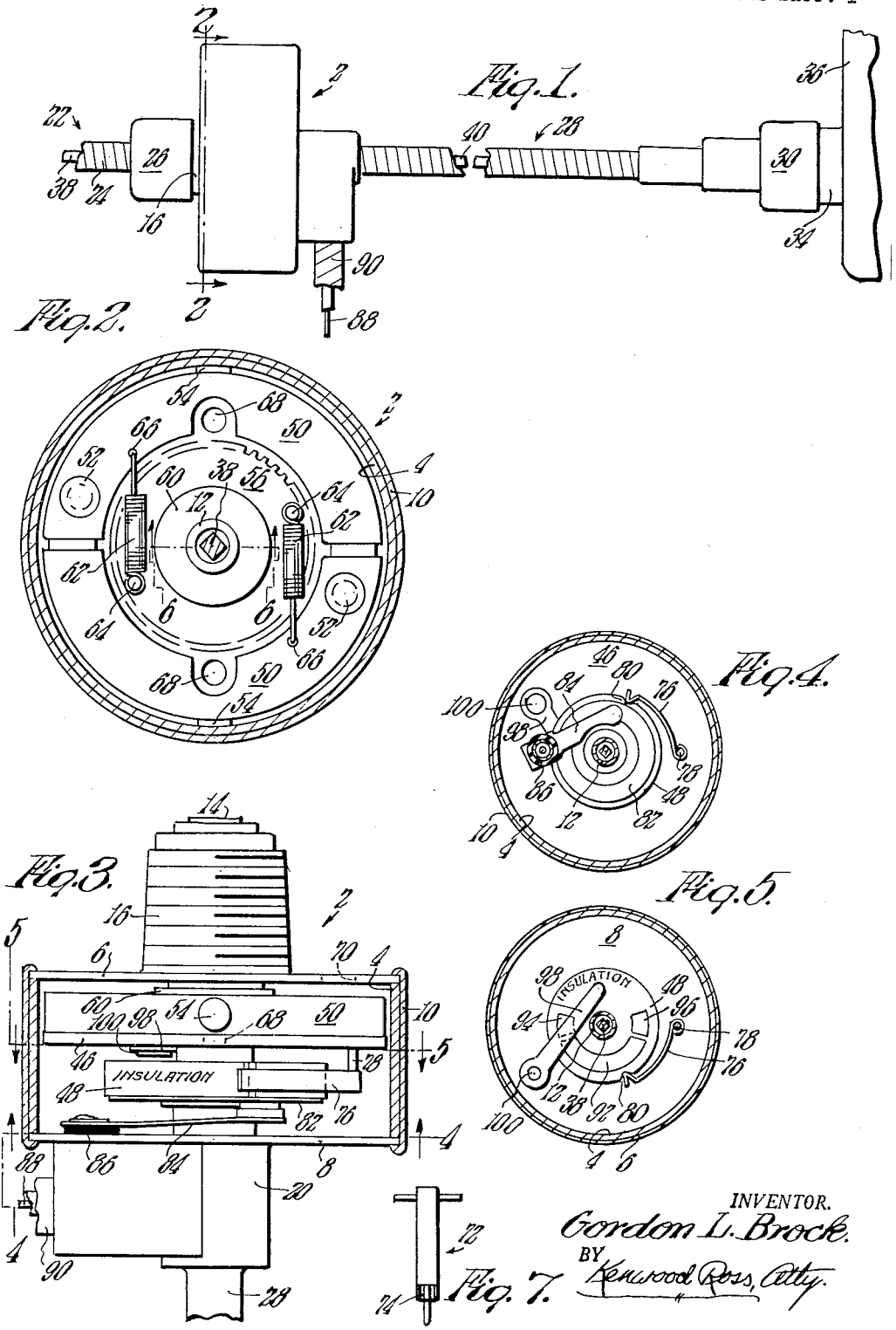

INVENTOR.
Gordon L. Brock.
BY Kenwood Ross, Atty.

United States Patent Office 2,998,498
Patented Aug. 29, 1961

2,998,498
SIGNALLING DEVICE
Gordon L. Brock, 1276 N. Millbury Ave.,
La Puente, Calif.
Filed Nov. 12, 1959, Ser. No. 852,277
2 Claims. (Cl. 200—61.46)

The present invention relates to new and useful improvements in structural refinements in a signalling device for indicating or signalling when a motor vehicle exceeds or has exceeded a certain or predetermined rate of speed. It is directed particularly to the provision of a structure adapted for connection between a motor vehicle speedometer and its driving cable incorporating means for energizing an indicating and/or signalling means when the vehicle travels in excess of a predetermined speed.

The invention resides in the particular arrangement, construction and relationship of the various elements of a signalling device, as exemplified in the detailed disclosure hereinafter set forth and wherein the objects of the invention, as defined in the paragraphs below, will be made apparent.

It is a principal object of the present invention to provide an inventively novel and improved construction of an adjustable type which may be set for what may be considered a safe driving rate of speed for the vehicle with which it is employed. Herein an indicator or signal is energized from a source of energy when the vehicle is driven in excess of that pre-selected driving speed, normally defined as a considered-safe speed.

Another primary purpose hereof is to provide advantageous structural and operational features in a device of the class to which reference has been made leading to its simplicity in construction, its adaptability to economical manufacture, and its dependability in operational use, and further providing important distinct advantages in durability, efficiency, ease of operation and the like.

Another primary object hereof is to provide a device having the following inherent meritorious characteristics: first, the attainment of an improved apparatus wherein the various components are coordinated for facile assembly; second, the attainment of a more economical and higher speed of construction and assembly of the device due to its simplification of design and its unique composition of coacting parts; third, the attainment of a greater flexibility or a capability of adjustment than has been possible in related devices heretofore known; fourth, the provision of a construction which may be readily installed with respect to the purpose for which it is intended, and fifth, the provision of such other improvements in and relating to signalling devices of the type above referred to as are hereinafter described and claimed.

In addition to the practical advantages which I have herein before ascribed to my novel signalling device, it will be observed that the same is simple and compact in construction, is susceptible of being readily installed, convenience of arrangement of parts and extreme compactness, both conducive toward the provision of a device of small proportions, and ruggedness and durability, being further desirable features that have been borne in mind in its production and development.

The essential point of the present invention lies in its features as a differential speed recording and measuring unit. The invention accordingly envisions means to that end.

It will be helpful to an understanding thereof to analyze the more important features and aspects thereof, so that same may be kept in mind during the subsequent reading of the detailed description of the practical embodiment of my improvements and of the illustration thereof in the annexed drawings. It is first to be noted that the invention is embodied in any device having a capability for providing a vehicle owner with a positive control over the driver of his vehicle through the use of a recording meter which constitutes a permanent record of how the vehicle was operated with respect to operation over and under a preset maximum rate of driving speed. Warning elements are included to assist the driver in maintaining such operation within the specified limits.

The existing practice in the trade has normally been to utilize a ball governor device to actuate a sliding sleeve which, in turn, makes a contact so as to complete an electrical circuit which energizes a light or buzzer. Such devices heretofore known all have certain common and obvious objections that, in order to operate them, the fly weight governor is employed as the actuating device, and such is operationally unreliable.

I have devised a novel means whereby this objection is overcome. I accomplish this by the provision of a device wherein the flyweight governor performs the function of establishing a constant predetermined rate of revolution by inducing friction between it and the outer casing of the structure. Inasmuch as the shaft of the device is free to turn, irrespective of the governor, a contact segment assembly fixed to the shaft facilitates the completion of an electrical circuit or pulse each time that said shaft turns one revolution more than the governor. This differential is reflected in a flashing signal. When this same pulse is fed to a counting device, said unit measures and records the actual difference between a preset or preselected rate of speed and any excess speed at which the vehicle is being driven. Such a feature is not embodied in any known prior art device.

The audible and visual warning elements of the device hereof are by-products of the primary function above recited. Since they pulse at the same rate as the counter, the warning signals, both audible and visible, increase in frequency in direct relationship to the degree of the rate of speed in excess of the preset or preselected rate of speed.

Other objects and advantages of this invention will be in part obvious or in part pointed out more fully hereinafter. All will become apparent as the detailed description of the exemplary form thereof, intended to be protected by Letters Patent, proceeds below.

It will be obvious to those skilled in the art to which the invention pertains that same may be incorporated in several different constructions. The accompanying drawings, therefore are submitted merely as showing a preferred exemplification. The invention consists substantially in the combination, construction, location and relative arrangement of parts as herein described, though this physical embodiment is only indicative of but one of the plurality of ways in which its principles may be employed and in which its component parts may be combined and arranged.

Said embodiment is not intended to be exhaustive of nor limiting of, nor departing from the spirit of the invention. That is, the precise construction of the figures of the drawing need not be slavishly followed as, of course, the construction is desirably adapted for connection with any make of automobile or truck and may have to be modified in accordance with the particular use to which it is to be put.

Others thus may be enabled to adapt and modify these principles in numerous embodiments, variations and modifications, each as may be best adapted to the conditions of any particular use. Such adaptations and/or changes should be and are intended to be comprehended within the spirit and scope hereof and the meaning and range of equivalence of the claims annexed below which set forth the novel features which are characteristic of my invention.

The invention itself both as to its construction and methods of manufacture, will be better understood by reference to the following description, taken in connection with the accompanying drawings, forming part of this specification, which illustrate, the principle of the invention and the best contemplated mode for applying that principle by way of a construction in accordance therewith.

In said drawings, like characteristics of reference or numerals are employed to designate like or corresponding parts throughout the several views, and therein:

FIG. 1 is an elevational view of the device of the invention connected between the rear wall of a speedometer and a speedometer cable;

FIG. 2 is an enlarged sectional view on the line 2—2 of FIG. 1;

FIG. 3 is an elevational view through the housing of the device shown in FIG. 2 showing the components therewithin in elevation;

FIG. 4 is a small scale sectional view on the line 4—4 of FIG. 3;

FIG. 5 is a small scale sectional view on the line 5—5 of FIG. 3;

FIG. 7 is a side elevational view of a key for adjusting the governor assembly.

Figure 8:
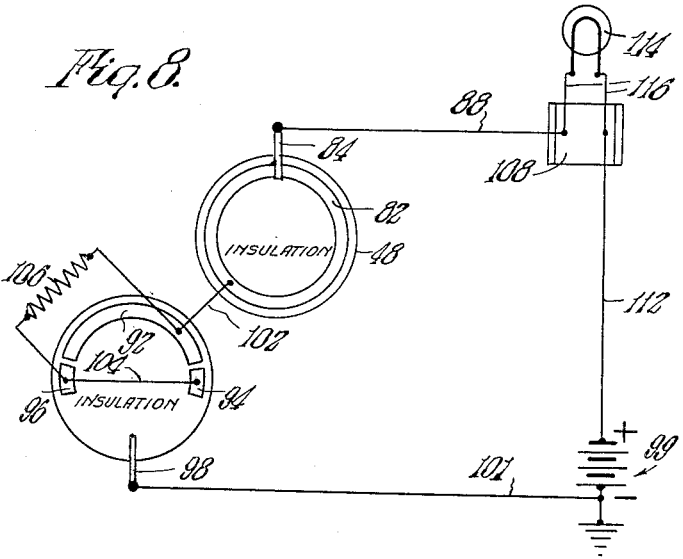
FIG. 8 is a wiring diagram to explain the operation of the device of the invention.

While, as aforesaid, the invention is susceptible of various modifications and alternative constructions, I have shown in the drawings and will here describe in detail a preferred embodiment, but it is to be understood that I do not thereby intend to limit the invention to this specific form but rather intend to cover all modifications, alternative constructions, and equivalents, falling within its spirit and scope.

In said detailed description and in the claims therefollowing various details are identified by specific names for convenience. These names however are intended to be as generic in their application as the art will permit.

Having continued reference now to the drawings, I have shown, in FIG. 1, the rear part of a speedometer and a speedometer cable, between which components the invention is disposed, in order that the general relation and utility of the device, as advantageously incorporated therewith, may be better understood.

The signalling device of the invention is generally represented by 2 and includes a housing or casing formed by an elongated inner tubular member 4, and outer and inner end plates 6 and 8 respectively at opposite ends of said member 4. An outer shell 10 may be provided around the inner member 4 with its opposite ends turned over onto the adjacent end plates as shown.

Figure 6:
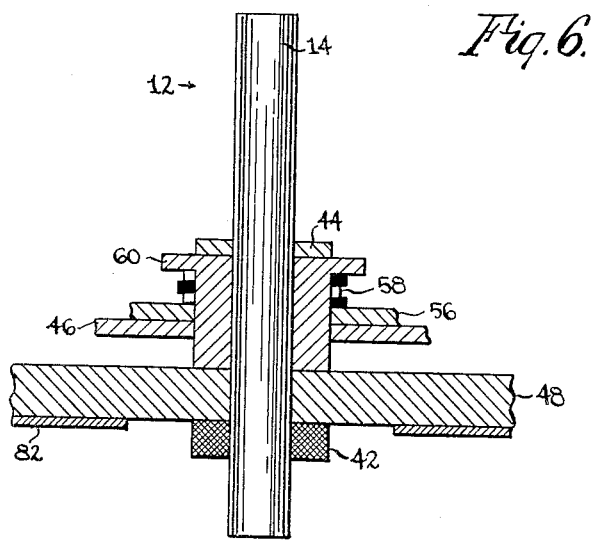
FIG. 6 is a small scale sectional view of the drive shaft of the device of my invention with certain of the mating components shown in section.

A drive shaft, generally indicated by 12, as shown in FIG. 6 has an outer end portion 14 which is rotatable in an outwardly extending threaded portion 16 of the outer end plate 6. It is correctly spaced and retained within the threaded portion 16 by the thrust washer 44, said thrust washer being rigidly fixed to the drive shaft 12. The drive shaft also has an inner end portion 18 which is rotatable in a hub part 20 of the inner end plate 8, wherefore the said drive shaft is rotatable relative to and within the housing.

The driving cable of a speedometer generally indicated by 22, is of conventional design, and includes the usual outermost flexible conduit 24 enclosing the usual flexible and rotatable member 38. The conduit 24 is provided with a nut means 26 permitting threaded engagement of the conduit with an outwardly projecting threaded part 16 of the outer end plate 6.

The drive end of conduit 24 is secured to that driving component of the vehicle by means of which the rate of speed with which the vehicle is driven is indicated by the speedometer by means of an indicating needle registrable against a scale so as to offer a visual reading as expressed in miles per hour for example, all as is well known.

Inner end plate 8 is provided with an outwardly projecting hub part 20 to which one end of a flexible conduit 28 may be secured in any known manner. The other end of conduit 28 is provided with an internally threaded nut 30 revolvably engaged with the usual threaded part 34 at the rear face of the vehicle speedometer 36.

Rotatable member 38 within conduit 24 is connected to the device hereof by means of an end portion extendible into the outer end 14 of drive shaft 12 to which it is connected, as by splining so as to effect rotation of the drive shaft therewith.

A flexible and rotatable member 40 is disposed within flexible conduit 28 and is connected at one end to the inner end 18 of drive shaft 12, as by splining or the like, so as to be rotated thereby. It is connected at its opposite end to the drive shaft of speedometer 36, in the well known manner, wherefor as member 38 is rotated, during vehicle operation, the drive shaft 12, the rotatable member 40, and the speedometer drive shaft are accordingly rotated.

That is, the speedometer driving cable is splined to drive shaft 12 within the housing and drive shaft 12 in turn is connected to the speedometer drive shaft through member 40. With drive shaft 12 of the apparatus being connected between the speedometer driving shaft and the speedometer drive shaft, it is rotatable therewith during movement of the vehicle and the revolutions per minute of such rotation vary accordingly as the driven speed of the vehicle varies.

A standard calibration for a vehicle speedometer is such that the speedometer pointer indicates a speed of sixty miles per hour when the speedometer drive shaft is rotating at 1000 r.p.m. Accordingly, one thousand revolutions of the speedometer driving cable 38 and the speedometer drive shaft, and the drive shaft 12 and the member 40 disposed therebetween, represent a distance travelled by that vehicle of one mile.

Each differential revolution which may be registered, as will hereinafter appear, is thus equal to one one-thousandth of a mile.

It is accordingly possible, with the counter employed with the device hereof, to compute directly from that counter the total distance travelled at a speed in excess of a preset or preselected speed.

A governor assembly which consists of a governor plate 46 and all components attached thereto, subsequently to be described, is disposed within the housing and is rotatable independently upon drive shaft 12 through a flanged bushing 60, said flanged bushing being rigidly fixed to governor plate 46, the governor assembly not being fixed to said drive shaft. It is rotatable at the speed of, at less than the speed of, and greater than the speed of said drive shaft.

A disc or contact segment insulator 48 of insulating material, preferentially nylon, is rigidly fixed to the shaft 12 and is disposed below and spaced from governor plate 46 by the downwardly extended portion of the flanged bushing 60. Being fixed to the shaft, the disc 48 turns therewith at the same rate of revolutions at all times.

A thrust spacer 42 is disposed between the contact segment assembly and the inner end plate 8 so as to provide the correct separation between the transfer wiper 84 and the transfer ring 82. The thrust spacer 42 in conjunction with the thrust washer 44 positions the entire inner assembly within the housing, thus providing correct clearance tolerances for proper operation.

A pair of governor arms or halves 50, sometimes called fly weights, are disposed on the upper side of the governor plate 46, and are pivoted thereto at 52 for relative swinging movements through centrifugal action. Each arm is provided with a friction pad 54 projecting outwardly from the outer side edge thereof. An adjustment gear 56 is mounted on the flanged bushing 60 and overlies the governor plate 46 so as to be rotatable relative to the governor plate 46 and the flanged bushing 60. Said gear 56 is caused to frictionally engage said plate 46 by means of an adjustment gear spring 58 which is mounted onto the flanged bushing 60 and is disposed between the gear 56 and the flanged portion of bushing 60, said bushing being rigidly fixed to the governor plate 46.

The spring 58 produces a sufficient friction drag between the adjustment gear 56 and the governor plate 46 to hold any setting of the fly weight springs now to be described.

The fly weight springs 62 are of a pair and each has one end thereof engaged with a related post 64 extending upwardly from the adjustment gear 56 in an upstanding manner and an opposite end thereof engaged in a related aperture 66 of the respective governor arm 50 which it serves.

The governor plate 46 is provided with one or more apertures or adjustment holes 68 and the outer end plate 6 thereabove is provided with one or more apertures or adjustment holes 70.

A meshing adjustment key, generally indicated by 72 and shown in FIG. 7, is manually insertable through one of said apertures 70 of the outer end plate 6 and one of said apertures 68 of the governor plate 46, when the respective apertures are aligned and in register so that adjustment of the adjustment gear 56 may be easily accomplished without the necessity for any disassembly.

The adjustment key is provided with teeth 74 circumadjacent the lower end thereof, as shown, which teeth are for purposes of meshing with the teeth of the gear 56 during the adjusting operation.

Thereby, the adjustment gear 56 may be adjusted by the mechanical rotation thereof relative to the governor plate 46 so as to effect an increase or a decrease in the tension of the fly weight springs 62 of the pair thereof and to vary the resistance to the outward swinging movements of the arms or fly weights 50.

That is, adjustment is accomplished by inserting the key through the aligned apertures or adjustment holes and effecting the turning of the adjustment gear clockwise or counter-clockwise so as to increase or decrease respectively the tension of the springs 62 by the rotating of the adjustment gear carrying one of the ends of said springs relative to the governor plate 46 carrying the fly weights to which the other of the ends of the springs are fixed. Through this means, the tension on the arms or fly weights 50 is increased or decreased accordingly.

The springs 62 of the pair thereof are adjustable wherefor the contact segment insulator or disc 48 and the governor plate 46 and its related instrumentalities rotate with the shaft 12 up to a predetermined or selected driving speed as represented by the speed of rotation of the speedometer driving cable 38 and the drive shaft 12.

A resilient detent spring 76 of the leaf spring type has one end fixed to a post 78 depending downwardly from the governor plate 46 as best shown in FIGS. 3 and 5, and has its other free end releasably engageable in a detent notch 80 in the peripheral edge of the contact segment insulator or disc 48, as shown.

A light drag is provided between the peripheral surface of the disc 48 and the detent spring 76 to effect rotation of the governor plate 46 and its related components through the detent spring 76 and the post 78 as the drive shaft 12 is rotated. This concomitant motion between the disc 48 and the governor plate 46 ensues until the preset revolutions per minute speed is reached.

Increased drag is provided at one point on the periphery of the disc 48 by the aforedescribed detent notch and the detent spring engageable therein so as to prevent any creeping at lower speeds than the present speed.

So long as the speed of the drive shaft 12 does not exceed the speed to which the governor and its related components are set by means of the fly weight springs 62, the free end of the detent spring 76 remains in the notch 80 of the disc 48.

Stated otherwise, the disc 48, through the detent spring 76 and the post 78, rotates the governor plate 46 and its related components while the speed of the shaft 12 does not exceed that selected speed for which the governor plate and its related components are set. This concomitant motion is further assisted by the natural friction which exists between the drive shaft 12 and the bushing 60 in addition to that friction which exists between the thrust washer 42 and the outer surface of the flanged portion of bushing 60.

When the governor plate and its related components reach a revolutions per minute speed at which the centrifugal force reacting on the governor arms overcomes the preset spring tension of the fly weight springs, the governor arms move outwardly upon their respective pivot members and contact the outer casing so as to induce drag at this moment.

As the speed of the drive shaft continues to increase, the governor plate and its related components maintain a constant revolutions per minute speed and thereby establish a rotational differential between the drive shaft and its related components and the governor plate and its related components.

Stated otherwise, when the rotational speed of the drive shaft 12 exceeds that for which the governor plate and its related components are set, the detent notch 80 in the contact segment insulator of disc 48 disengages the detent spring 76, the contact segment insulator being fixed to and driven by the drive shaft, all so as to permit the increased rotational speed of the drive shaft whereas the governor assembly maintains a constant speed resulting from the frictional engagement of the pads 54 with the inner wall of the housing member 4.

With respect to this aforedescribed r.p.m. differential, at all speeds below the pre-set speed, the governor plate rotates with the drive shaft. This results from the action of the natural friction between the governor plate and the shaft and from the induced friction between the detent spring which is supported from the governor plate and the detent notch on the contact segment insulator. At and above the pre-set speed, the governor arms engage the casing wall and the resulting friction causes the governor plate and its components to maintain a constant and fixed speed of revolutions per minute. Thus, when the drive shaft rotates at a speed greater than the governor plate, the contact segment insulator which is fixed to the drive shaft, is caused to rotate about the detent spring fixed and depending from the governor plate.

Let it here be explained, by way of summation, that what is broadly envisioned thus far is a governor or fly weight assembly which includes the governor or fly weight plate 46, the pair of governor arms or fly weights 50 pivoted to the plate, and the adjustment gear 56 frictionally engageable with and rotatable relative to the governor plate. The governor assembly is mounted on shaft 12, is supported by a bushing mounted centrally of governor plate 46, and is disposed between thrust washer 42 of drive shaft 12 and disc 48. The governor assembly is not attached to the drive shaft and the drive shaft is free to turn independently of the governor assembly.

Fly weights 50 are each pivotally mounted on the rear of governor plate 46 and are each connected to a related fly weight spring 62. Said fly weight springs are each connected to the adjustment gear 56 at the end thereof opposite from the connection to the respective fly weight 50 which it serves.

Additionally, the broad concept thus far envisions what is identified, for purposes of convenience, as a contact segment assembly which includes the contact insulator or disc 48 rigidly fixed to the drive shaft 12 and rotatable therewith, and the leaf spring detent 76 which rides along the outer peripheral edge of the disc 48. It engages in the detent notch 80 of the disc 48 and because of the increased friction encountered thereat has a tendency to creep toward and to remain in said notch at speeds below a preset speed, being releasable therefrom as said disc 48 rotates at a greater speed than that for which the governor assembly is set.

To continue with the description, the inner face of the disc 48 of the contact segment assembly has a metallic contact or transfer ring 82 fixed thereto. A metallic contact arm, identified as a transfer wiper 84, has an inner end in wiping contact with the transfer ring 82 and an outer end mounted on an insulating member 86 of the inner end plate 8.

A connecting wire 88 has a free end electrically connected to the outer end of the transfer wiper 84 and extends through the insulating member 86 and outwardly from the housing 2 through a conduit 90, as shown in FIG. 3.

The opposite outer face of the disc 48 of the contact segment assembly has fixed thereto a trio of exposed contact surfaces, namely a metallic primary segment or contact 92 and a pair of metallic secondary segments or contacts 94 and 96 adjacent and spaced from opposite ends of said primary segment.

The portion of the outer face of the disc 48 not covered by the primary and secondary segments or contacts is identified as the "no-contact area."

The two secondary segments 94 and 96 are interconnected by a thin conducting member, thence the two are connected to a resistor 106 which is in turn connected to the primary segment 92 which is in turn connected to the transfer ring 82.

That is to say, the primary segment is connected directly to the transfer ring whereas a resistor 106 is disposed between the secondary segments and the transfer ring.

An arm or fly weight wiper 98 is secured at one end to the inner side of the governor plate 46 at 100 and is so formed as to permit a wiping action by its opposite free end across the segments 94, 92 and 96 successively when, in operation, the speed of the drive shaft 12 exceeds the speed of the governor assembly so as to rotate the contact segment assembly relative to the governor assembly.

When the detent spring 76 is in the detent notch 80, arm or fly weight wiper 98 remains in the "no-contact area" or off-position of the member 48.

When there is a differential speed between the shaft 12 and the governor, the contact segment assembly rotates about the flyweight wiper 98 so as to bring the flyweight wiper into contact position with one of the secondary segments, thence to contact position with the primary contact segment, thence to contact position with the other secondary segment, and in turn back to the "no contact area" of off-position.

The transfer wiper 84, attached to the rear face of the inner end plate 8, rides on the transfer ring 82 fixed to the inner face of the disc 48.

When the speed of the shaft 12 is not in excess of that of the governor, the end of the detent spring 76 remains in the detent notch 80 of the disc 48 and the inner end of the flyweight wiper 98 is in the "no-contact area" and out of contact with the segments as indicated in FIG. 5.

At the beginning of a cycle, the flyweight wiper is positioned in the "no-contact area" by the action of the detent spring being positioned in the detent notch. As the disc 48 rotates, dislodging the detent spring out of the detent notch, the segments on the disc come into contact with the flyweight wiper in the order of first, a secondary segment, second, the primary segment, and third, the other of the secondary segments and then back to the "no-contact area."

This cycle transmits an electrical impulse to the solenoid of a counter so as to actuate the armature of the counter to advance a counter wheel one digit, as will subsequently be observed.

The electrical components are connected, as shown in FIG. 8.

In connection with a vehicle, it will be assumed that the negative terminal of a battery is connected to the vehicle frame or ground and the flyweight wiper 98 is connected to ground through the speedometer drive shaft and driving cable.

The flyweight wiper 98 is connected by 101 to the negative side of a battery 99 and to ground. The transfer ring 82 of the disc 48 is connected by 102 to the primary contact segment 92 of said disc. The secondary segments 94 and 96 of the disc are connected by 104 and are commonly interconnected to the primary segment 96 through the resistor 106.

The solenoid of a counting device of conventional form (not shown) is represented by 108. The solenoid is connected to the arm 84 by 88 and to the positive side of the battery 99 by 112.

The counter, of which the solenoid 108 is the actuator, indicates in decimal units and is of such type that, each time the solenoid receives an energy impulse of sufficient magnitude, the armature of the counter is attracted thereby to operate a digit indicating wheel or wheels in the well known manner. That is, the counter indicates successive digits accordingly as the solenoid receives successive energy impulses of a magnitude necessary for the operation of the counter.

A warning signal in the form of a light bulb or pilot lamp 114 is provided and is connected in parallel with the solenoid 108 by 116.

The pilot lamp, being connected in parallel with the counter is energized therewith, and this, in conjunction with such noise as is produced by the action of the counter, provides the audio-visual warning feature.

Additionally, the counter provides the recording element. Such recording represents the difference between the pre-set speed and the speed at which the vehicle is actually driven, registered in miles and/or parts of miles (that is, the distance travelled).

An electrical circuit is completed and a pulse is delivered to the counter and to the signal lamp each time that the drive shaft turns one revolution more than the governor. It is the differential which is reflected in this signal in the signal lamp and in the measurement taken and recorded by the counter.

Thus the counter measures and records the actual difference between a preset or preselected rate of speed and any excess speed at which the vehicle is being driven.

Normally, while the speed of the drive shaft 12 is not in excess of that for which the governor assembly is set, the governor plate 46 is positioned by the detent spring 76 thereof in engagement with the notch 80 of the disc 48, and the arm or wiper 98 is out of contact with the segments of disc 48.

When the speed of the drive shaft 12 exceeds that for which the governor assembly is set, the disc 48 rotates with the shaft 12, whereas the governor assembly maintains a constant pre-set revolutions per minute as a result of the friction between the flyweight pads 54 and the inner side of the member 4 of the housing, said friction being caused by the centrifugal force being exerted on the flyweights. That is, disc 48 rotates relative to the governor plate and the arm or wiper secured thereto.

On the rotation of the disc 48 relative to the flyweight wiper 98 and the governor assembly, when the end of said wiper is in contact with the segment 96, current flows through the resistor 106 and the connection 102 to the transfer ring 82, through the transfer wiper 84 in contact therewith, through connection 88 to the solenoid coil 108 and lamp 114, and thence to the battery positive. The resistance of the resistor 106 is such that the solenoid coil does not receive an impulse of sufficient electrical energy to operate the counter.

However, when the flyweight wiper 98 makes a contact with the primary segment 92, current flows through connection 102 to the transfer ring 82, the transfer wiper 84 and connection 88 to the solenoid coil and the lamp to the battery. The impulse of energy to the solenoid, in this case, is sufficient for the operation of the counter so that it indicates a digit.

For clarification, let it be assumed that the negative terminal of the vehicle battery 99 is connected to ground or common.

The battery common (negative) is connected to the flyweight wiper 98, through the speedometer cable, the transmitter case, the case bushings, the shaft, the flyweight assembly bushing, and the flyweight plate, thus giving the flyweight wiper 98 a negative potential.

The wiper 98 is normally held in the no-contact area by the friction of the detent spring in the detent notch. Accordingly no current passes.

When a differential r.p.m. exists between the shaft and the flyweight (governor) assembly, the contact segment assembly rotates around the wiper 98.

When the wiper touches one of the secondary segments, current flows through the said secondary segment, the resistor 106, the ring 82 of the disc 48, the wiper 84, to the solenoid 108 and the signal 114 and completes the electrical circuit to the positive terminal of the battery.

The magnitude of this current, reduced by the resistor, is not sufficient to actuate the counting device.

When the wiper 98 moves onto the primary segment 92, it bridges initially both the secondary and primary segments, so that current flows through the primary segment 92 to the transfer ring contact 82, the end plate wiper 84 to the solenoid of the counter and the signal lamp to the battery.

The magnitude of this current is sufficient to actuate the counter.

Should the arm 98 back off of the primary segment on to the secondary segment because of vibration or any unbalanced condition of the governor assembly or like condition, the magnitude of the resisted current is sufficient to hold the counter down once it has been actuated by the unresisted current from the primary segment 92.

Thus, the counter will not chatter or mis-count due to vibration or unbalanced condition.

As the arm 98 continues on to the opposite secondary segment, the current flow is the same as for the other secondary segment.

Thus the counter is still held down.

As the arm 98 moves off of the secondary segment to the no-contact area, current ceases to flow and the counter is released and ready for the next count.

Should the arm 98 back up on to the secondary segment, the resisted current will not actuate the counter once it has been released, thereby again eliminating chatter or mis-count of the counter due to vibration and the like.

In this manner, each differential revolution is registered on the counter. Therefore the total differential can be determined at any time, thus affording the vehicle owner the opportunity to monitor the excess speed at which his vehicle has been operated.

It is to be understood that the phraseology or terminology employed herein is for the purpose of description and not of limitation. Although specific terms and expressions are employed, they are used in a generic and descriptive sense only and not for purposes of limitation. I have no intention, in the use of such specific terms and expressions, of excluding any equivalents of the features shown and described or portions thereof, but recognize that various modifications are possible within the scope of the invention claimed.

Without further analysis, the foregoing is intended to so fully reveal the gist of my invention and the construction and operation of the device thereof that others can, by applying current knowledge, readily adapt it for various applications without omitting features which, from the standpoint of prior art, fairly constitute essential characteristics of the generic or specific aspects of this invention, all modifications and variations reasonably falling within the meaning and purview and range of equivalency of this disclosure and claims thereof being intended to be embraced herein.

Accordingly, limitation of this invention should be made only as determined by a proper interpretation of the terms used in the subjoined claims.

It is intended to claim the invention, broadly as well as specifically, as indicated by the appended claims.

What is claimed as new and useful is:

1. A speed indicating apparatus for use in combination with the speedometer and drive shaft and driving cable therefor of a vehicle for indicating when the vehicle has exceeded a predetermined rate of speed comprising, a housing having oppositely disposed end plates, a drive shaft journalled in the end plates of said housing with one end connected to the speedometer driving cable and being rotatable therewith and with one end connected to the speedometer drive shaft, a governor assembly disposed within said housing upon said drive shaft and being rotatable independently of said drive shaft, a contact wiper assembly disposed within said housing adjacent and in spaced relation to said governor assembly and being fixed to said drive shaft and rotatable thereby, a governor plate mounted on said drive shaft, fly weights pivotally mounted on said governor plate, an adjustment gear frictionally engageable with said governor plate, tension springs each connecting between one of said fly weights and said adjustment gear, said fly weights having friction means for embracement with said housing for preventing free rotation of said governor assembly, and establishing a constant predetermined speed of revolution thereof, means providing for the concomitant rotation of said governor and contact wiper assembly through said drive shaft as the vehicle is driven at a speed rate less than a preselected rate of speed and for the frictional engagement of said governor assembly with said housing when said drive shaft and contact wiper assembly are rotated faster by said drive shaft through the driving of the vehicle at a speed rate in excess of the preselected rate of speed.

2. An adjustable excess speed indicating device for coaction with and disposition between the shaft of a vehicle speedometer and the driving cable therefor for indicating the speed rate of a vehicle at a speed in excess of a preselected driving speed comprising, a housing, a drive shaft journalled in said housing and having ends connected to and rotatable with the speedometer driving cable and connected to the speedometer drive shaft, a governor assembly disposed within said housing and rotatable independently of and on said drive shaft, said governor assembly including a governor plate mounted on said drive shaft and fly weights pivotally mounted on the governor plate and an adjustment gear frictionally engageable with the governor plate and tension springs each connecting between a fly weight and the adjustment gear, the fly weights of said governor assembly having friction means for embracement with said housing for preventing free rotation of said governor assembly, a contact wiper assembly fixed to said drive shaft within said housing in spaced relation to said governor assembly and being rotatable by said drive shaft, means allowing the concomitant rotation of said governor and contact wiper assembly through said drive shaft as the vehicle is driven at a rate of speed not in excess of a preselected rate of speed and effectuating the frictional engagement of the flyweights of said governor assembly with said housing as said drive shaft and contact wiper assembly are rotated faster by said drive shaft as the vehicle is driven at a rate of speed in excess of the preselected rate of speed.

References Cited in the file of this patent

UNITED STATES PATENTS

| | | |
|---|---|---|
| 1,311,135 | Olds | July 22, 1919 |
| 2,779,444 | Sohlberg | Jan. 29, 1957 |